C. E. BLUE.
MANUFACTURE OF GLASS.
APPLICATION FILED SEPT. 9, 1908.
1,015,538.
Patented Jan. 23, 1912.
5 SHEETS—SHEET 2.
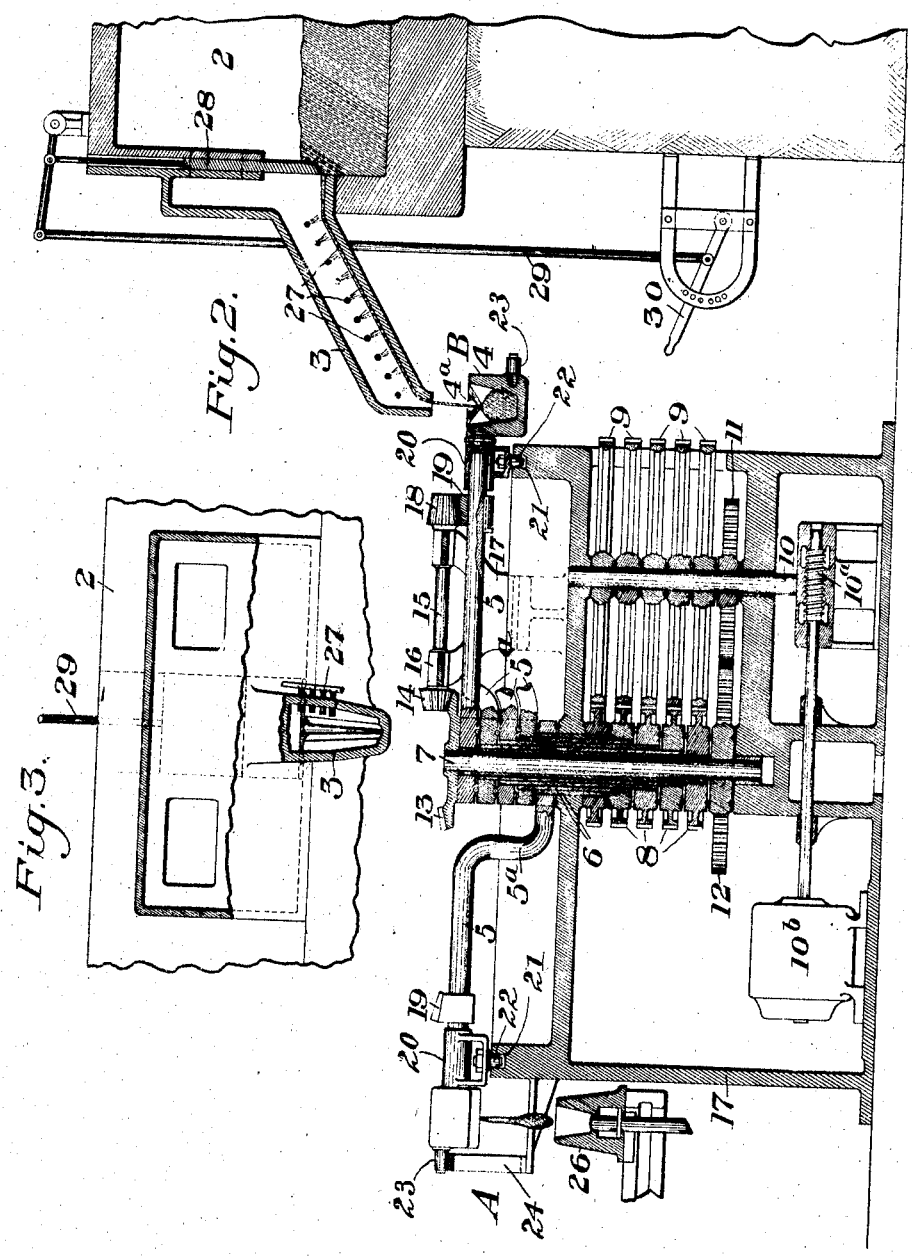

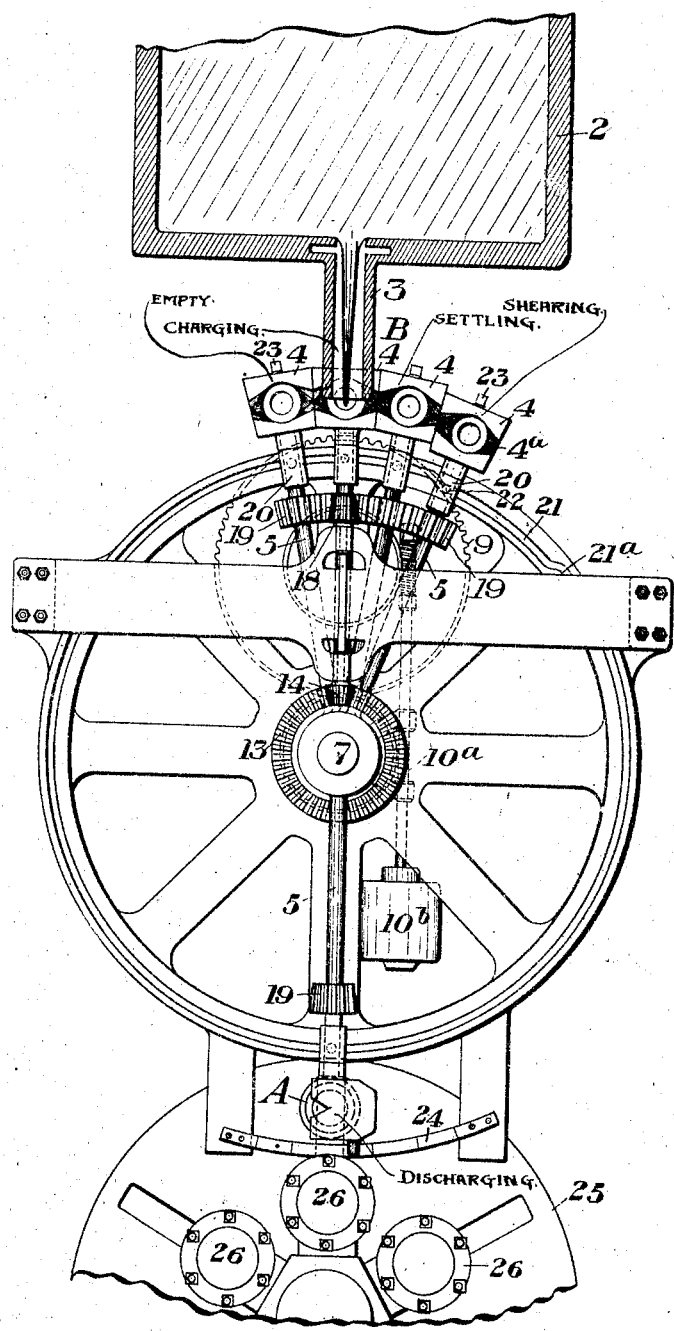

C. E. BLUE.
MANUFACTURE OF GLASS.
APPLICATION FILED SEPT. 9, 1908.
1,015,538.
Patented Jan. 23, 1912.
5 SHEETS—SHEET 3.
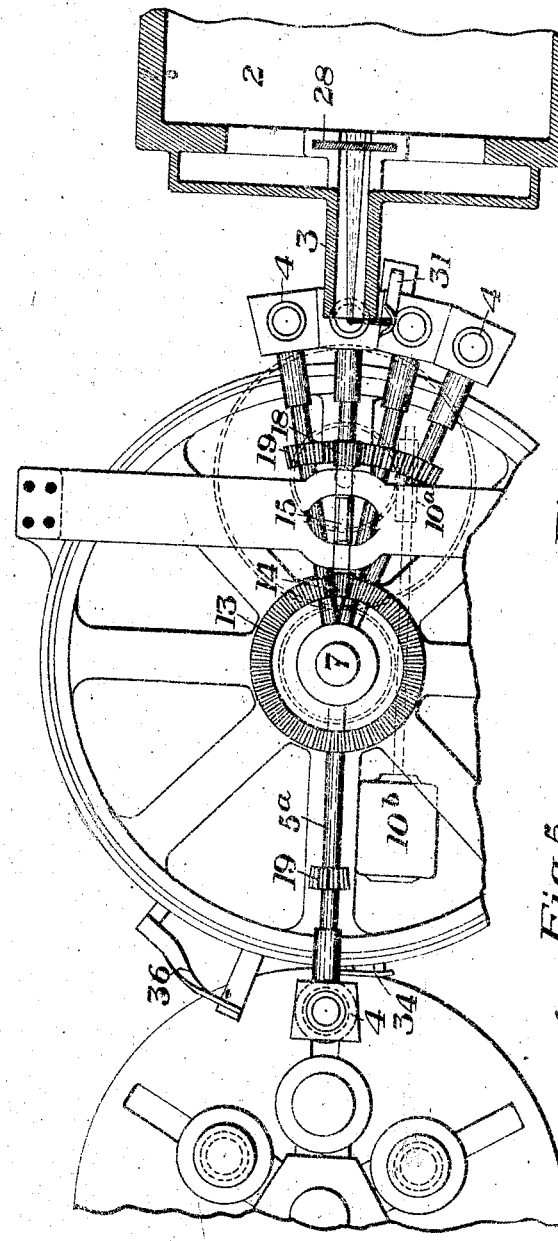
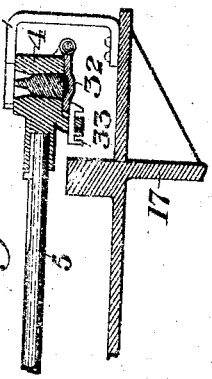
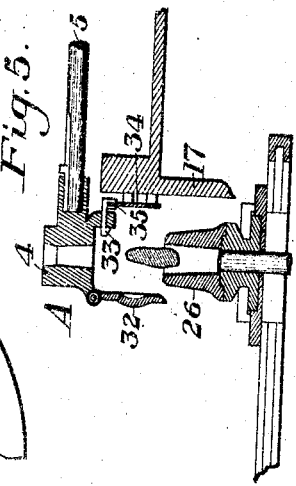
WITNESSES:
R H Balderson
W W Swartz
INVENTOR.
C. E. Blue.
BY Bakewell, Byrnes & Parmelee
his ATTORNEYS C. E. BLUE.
MANUFACTURE OF GLASS.
APPLICATION FILED SEPT. 9, 1908.
1,015,538.
Patented Jan. 23, 1912.
5 SHEETS—SHEET 4.
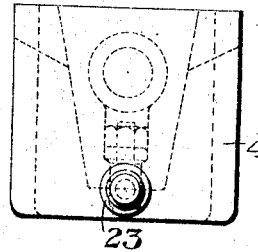
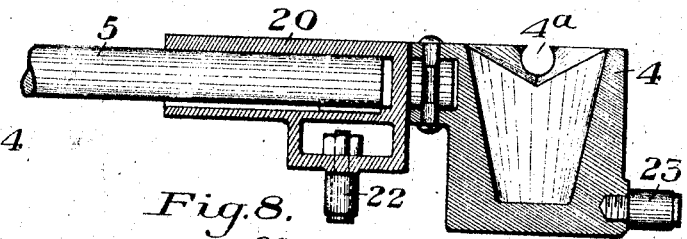
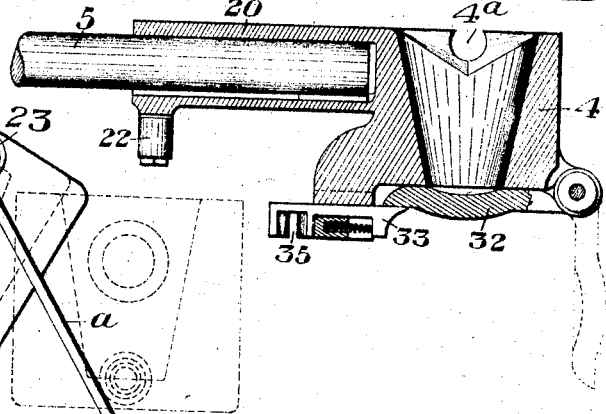
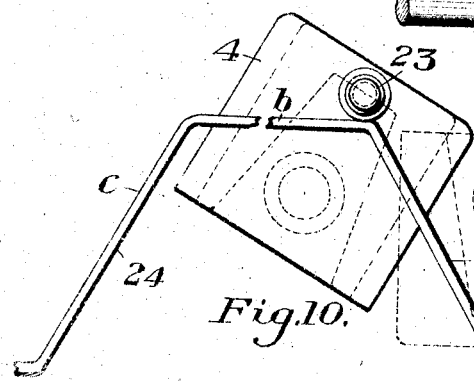
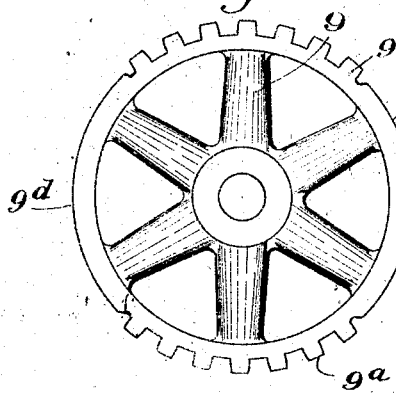
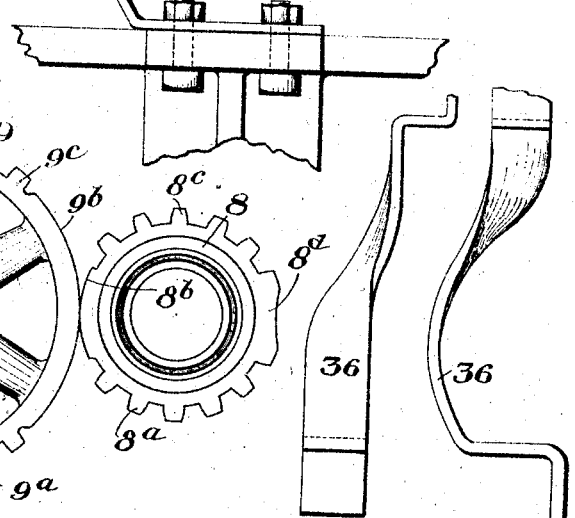
WITNESSES
R A Balderson
W W Swartz
INVENTOR
C. E. Blue,
by Bakewell, Byrnes & Parmelee
his Attys

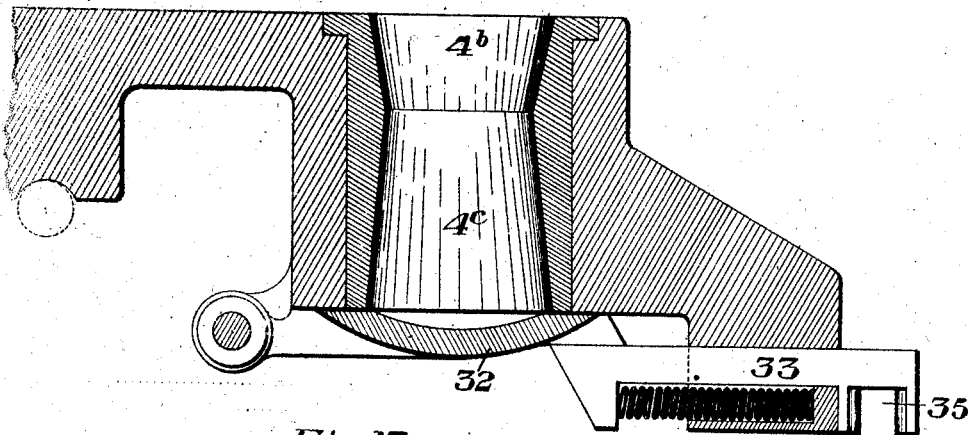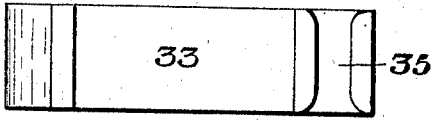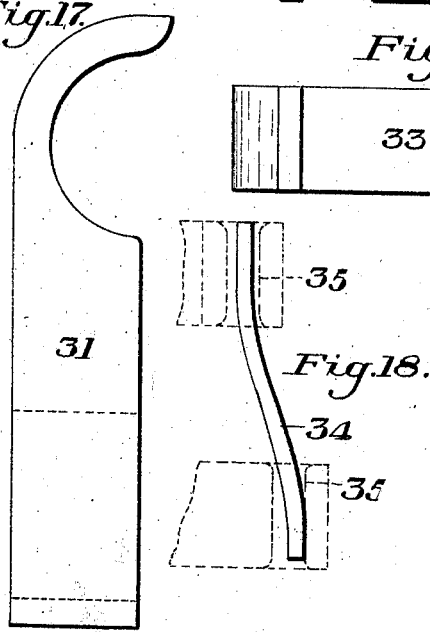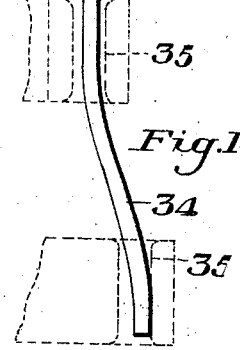

_BEST AVAILABLE COPY_

UNITED STATES PATENT OFFICE.

CHARLES EDWIN BLUE, OF WHEELING, WEST VIRGINIA.

MANUFACTURE OF GLASS.

1,015,538.   Specification of Letters Patent.   Patented Jan. 23, 1912.

Application filed September 9, 1908. Serial No. 452,193. REISSUED

*To all whom it may concern:*

Be it known that I, CHARLES E. BLUE, of Wheeling, Ohio county, West Virginia, have invented a new and useful Improvement in the Manufacture of Glass, of which the following is a full, clear, and exact description, reference being had to the accompanying drawings, forming part of this specification, in which—

Figure 1 is a plan view, with a portion of a melting furnace or vessel in section, of one form of apparatus embodying my invention. Fig. 2 is a vertical section of the same; Fig. 3 is a broken sectional plan view showing the discharge portion of the melting vessel or furnace; Fig. 4 is a view similar to Fig. 1, but showing a modification; Figs. 5 and 6 are sectional detail views of the measuring receptacles shown in Fig. 4, showing the manner of discharging the same; Fig. 7 is a detail sectional view of the measuring receptacle illustrated in Figs. 1 and 2; Fig. 8 is a detail sectional view of another modified form of measuring device; Fig. 9 is an end view of the receptacle shown in Fig. 7; Fig. 10 is a detail view showing the manner in which the receptacle shown in Figs. 1, 2 and 7 are tipped into discharging position; Fig. 11 is a detail view of one set of intermittently acting gears; and Figs. 12 and 13 are detail views showing the cam for closing the valves of the measuring receptacle shown in Figs. 4, 5 and 6. Fig. 14 is a detail sectional view of one of the measuring receptacles on a larger scale and showing a different form of receptacle; Fig. 15 is a detail plan view of the latch device; Fig. 16 is a detail view of the cam for re-closing the receptacles; Fig. 17 is a detail view of the shear or cut-off device; and Fig. 18 is a detail view of a cam device for releasing the latch shown in Fig. 14.

My invention relates to the manufacture of glass, and is designed to provide novel means for transferring the glass from a melting vessel or furnace to the molds, without the necessity for gathering the glass in the manner commonly employed. In accordance with my invention, a stream of molten glass is caused to flow continuously from the melting pot or vessel into a plurality of receptacles brought successively in position to receive the same, each of said receptacles being arranged to receive a measured quantity of glass. After each receptacle has been filled in this manner, the glass connecting the glass in the two receptacles is cut off or sheared, after the receptacle has been moved away from the continuously flowing stream, and the receptacles are then transferred to a discharging station, where their contents are discharged into a mold vessel.

The precise nature of the invention will be best understood by reference to the accompanying drawings, which will now be described, it being premised, however, that the invention is susceptible of various changes and modifications by those skilled in the art without departing from the spirit and scope as defined in the appended claims.

Referring first to the form of my invention which is shown in Figs. 1 and 2, the numeral 2 designates a melting pot or vessel, having an overhanging discharging spout 3 through which a continuous stream of glass is caused to flow while the machine is in operation. 4 designates a series of measuring receptacles or cups, which are arranged to be brought successively into position to receive the glass discharged from the spout 3. Each of these receptacles is mounted upon the outer end portion of a radially extending arm 5. The series of arms 5, of which five are shown in the present instance, are each connected at its inner end to a sleeve 6 mounted around a shaft 7. These sleeves 6 are mounted one around and upon another in the manner clearly shown in Fig. 2, the sleeves being of different lengths at both their upper and lower ends, and the arms 5 excepting the upper arm have bent portions 5ª which bring them from the plane of the upper end portion of their respective sleeves into the plane of the upper surface of the apparatus, the several cups 4 being all in the same horizontal plane. On the lower end portion of each sleeve 6 is an interrupted pinion 8, which is arranged to be driven by a gear wheel 9 having intermittent teeth, one of these pinions and its gear wheel being shown in detail in Fig. 11. As will be clearly understood from Fig. 2, each sleeve is provided with one of the pinions 8, placed one above another about the shafts 7 as an axis, and the gear wheels 9 are similarly arranged upon a shaft 10 to which they are secured. The shafts 10 and 7 are also intergeared by means of the spur gear wheels 11 and 12, so that the shaft 7 will be continuously rotated. The shaft 10 is rotated by a worm gear connection 10ᵃ with a motor 10ᵇ. On the upper end of the shaft 7 is a beveled toothed wheel 13, whose teeth are engaged by a bevel pinion 14 on a radial shaft 15 mounted in bearings 16 of the frame 17, and carrying at its outer end a beveled toothed pinion 18. On each of the arms 5 is a toothed rack segment 19. These segments are secured on the arms 5 into position to be brought underneath the bevel pinion 18 and engage with the teeth thereof for the purpose hereinafter described. The cups or receptacles 4 are arranged to fit closely together in the manner shown in Fig. 1, with laterally extending cavities or depressions 4ᵃ in their upper surfaces extending in both directions from their central receiving cavity, as clearly shown in this figure. The cups or receptacles are provided with the sleeves 20, which are revolubly mounted on the outer ends of the arms 5 in the manner clearly shown in Fig. 7, so that when the cups are brought around to the discharging station they may be rotated in the manner hereinafter described into discharging position, as shown in Fig. 10.

21 is a cam flange or projection which is arranged to be engaged by a roller pin 22 on the sleeve 20 for the purpose of moving the cups in a radial direction toward the shaft 7, after they have been filled. The right-hand cup in Fig. 1 is shown as so moved, this movement being for the purpose of shearing or cutting off the glass connecting the glass in two adjacent cups. The cam flange 21 also has an offset portion 21ᵃ arranged to return the cups to their original positions after the shearing has been effected.

The operation is as follows:—The intermittent pinions 8 and gears 9 are so timed and arranged as to successively move the cups from the discharging station A to the receiving station B, at which they are filled. As each cup is brought adjacent to the charging station, its set of gears and pinions 8 and 9 go out of action, and the cup is moved slowly by the toothed portions 8ᵃ and 9ᵃ of the gears 8 and 9 respectively. The frictional engagement between the surfaces 8ᵇ and 9ᵇ will hold the cups 4, which are advancing toward the discharging spout in engagement with each other, and advance the last cup to a position where the beveled pinion 18 will engage its rack 19, to advance the cups beyond the charging station, and from which point they will be removed by the tooth portions 8ᶜ and 9ᶜ of the gears 8 and 9 respectively. This causes each cup to be moved slowly past the receiving station and to the settling and shearing stations which are at the points indicated on Fig. 1. After the shearing operation has been effected for each cup, its intermittent gear and pinion actuating connections again come into action and the cup is moved rapidly around to the discharging station. The cup will be held in this position a predetermined time by the lock engagement between the portions 8ᵈ and 9ᵈ of the gears 8 and 9 respectively. For the purpose of tipping the cups at these points to discharge their contents into a suitable mold vessel, each cup is provided with a projection, preferably in the form of a roller bearing 23, see Fig. 7, which comes into engagement with a cam member 24 in the manner shown in Figs. 1 and 10, thereby rotating the sleeve 20 on the arm 5 and tipping the cup into the position shown in full lines in Fig. 10. The cam 24 has the inclined portion a, which effects the tipping, the raised straight portion b which holds the cup temporarily in tipped position and an outwardly inclined portion c which returns the cup to its normal position.

25 designates a suitable carrier, having mounted thereon a series of mold vessels 26, which are designed to be brought successively into position to receive the contents of one of the cups 4 at the discharging station. As shown in Fig. 1, these mold vessels are capable of radial movement into and out of position to a point indicated at A to come underneath one of the cups 4, but this part of the apparatus has nothing to do with my present invention, as any suitable means may be employed for bringing the mold vessels into position.

27 in Figs. 2 and 3 designate gas jets, which may be employed to maintain the glass in the discharging spout 3 in a suitable fluid condition.

28 designates a gate or shutter by which the flow of glass from the melting tank or vessel can be controlled at will or shut off entirely through any suitable actuating connections, such as those indicated at 29, controlled by the lever 30 (see Fig. 2).

The form of my invention shown in Fig. 4 is similar to that shown in Figs. 1 and 2, except that instead of employing a radial movement of the cups relatively to each other for the purpose of shearing or cutting off the connecting portions of the glass, I provide, adjacent to the charging station an overhanging scraper or shearing arm 31 (see Fig. 6), which, as the receptacles are carried thereunder will scrape or sever such connecting portions. In this figure, I have also shown the cups as fixedly secured to their carrying arms 5ᵃ instead of rotatably mounted thereon. For this purpose I provide the cups with hinged bottom closures or valves 32, as best shown in Figs. 5, 6 and 8, these being normally held in closed position by the sliding spring latches 33. For the purpose of withdrawing these latches at the discharging station, to permit the bottom closures or valves 32 to open (as shown in Fig. 5) I provide the cam member 34 arranged to be engaged by a slot or fork 35 on the latch to cause the retraction of the latch. After passing the discharging station, these bottom valves may be closed by causing the forks 35 to engage with the cam 36. A detail view of the cam member 34 is shown in Fig. 18. Detail views of the cam member 36 are shown in Figs. 12 and 13.

The advantages of my invention will be apparent to those skilled in the art, since it provides mechanism of simple character whereby measured quantities of glass may be delivered to the mold vessel without the gathering operation usually employed. It will be seen that in the apparatus shown the cups or receptacles are given a comparatively rapid motion from the discharging station around to the charging station; they are then moved slowly past the charging, settling and shearing stations; and are then again moved more rapidly around to the discharging station, where they are again held stationary for a short period by the interrupted gears. Any sufficient number of these receptacles may be employed, so that the stream of glass may flow continuously, with the receptacle at all times in position to receive such stream except during the short interval when one receptacle is being moved out of receiving position and another into receiving position.

The measuring cups or receptacles 4 may be of various forms. Thus, in Figs. 7 and 8 I have shown them as having a continuous downward flare, while in Fig. 14 I have shown them as having the upper portion 4$^b$ of the cavity contracted downwardly and joining a lower portion 4$^c$, which is of downwardly increasing diameter.

It will also be understood that various other changes may be made in the details of construction and operation. Thus, the means employed for bringing the cups or receptacles to the charging station and for moving them to the discharging station may be varied, together with the gearing employed; the receptacles may themselves be mounted in other ways, and may be discharged in any suitable manner.

I claim:—

1. In apparatus for the manufacture of glass, means for delivering a continuous stream of molten glass, a plurality of supports mounted for separate movement around a common center, and measuring cups or vessels mounted on the supports and arranged to be moved thereby successively into position to receive the glass; substantially as described.

2. In apparatus for the manufacture of glass, means for delivering a continuous stream of molten glass, a plurality of supports mounted for separate movement around a common center, measuring cups or vessels mounted on the supports and arranged to be moved thereby successively into position to receive the glass, together with means for shearing or cutting off the glass between the receptacles on adjacent supports after they have been filled; substantially as described.

3. In apparatus for the manufacture of glass, means for delivering a continuous stream of molten glass, a plurality of supports mounted for separate movement around a common center, measuring cups or vessels mounted on the supports and arranged to be moved thereby successively into position to receive the glass, and means for imparting independent movements to the supports around their common center; substantially as described.

4. In apparatus for the manufacture of glass, means for delivering a continuous stream of molten glass, a plurality of supports mounted for separate movement around a common center, measuring cups or vessels mounted on the supports and arranged to be moved thereby successively into position to receive the glass, and means for separately actuating said supports at different speeds during different portions of their movements around their common center; substantially as described.

5. In apparatus for the manufacture of glass, means for delivering a continuous stream of molten glass, a plurality of supports mounted for separate movement around a common center, a measuring cup or vessel mounted on each of the supports, means for actuating the supports independently to bring the cups or receptacles successively in position to receive the molten glass, and means for shearing or cutting off the glass between adjacent cups or receptacles after they have been filled; substantially as described.

6. In apparatus for the manufacture of glass, a plurality of supports mounted for separate movement around a common center in a horizontal plane, a measuring cup or receptacle mounted on each support, means for separately actuating the supports, and means whereby the supports are actuated at different speeds during different portions of their rotary movement around their common center; substantially as described.

7. In apparatus for the manufacture of glass, a charging station having means for delivering a continuous stream of molten glass, a settling station, a shearing station, a discharging station, a plurality of measuring cups or vessels, a separately movable carrier for each cup or vessel mounted for separate movement around a common center, together with means for actuating the same; substantially as described.

8. In apparatus for the manufacture of glass, a charging station having means for delivering a continuous stream of molten glass, a settling station, a shearing station, a discharging station, a plurality of measuring cups or vessels, a separately movable carrier for each cup or vessel mounted for separate movement around a common center, together with means for actuating the same, and actuating means being arranged to impart a different speed of movement to the supports at different portions of their movements; substantially as described.

9. In apparatus for the manufacture of glass, a plurality of rotary supports, separate gearing for rotating each support, and a measuring cup or receptacle mounted on each support, and means for imparting a radial movement to each cup or receptacle relative to an adjacent receptacle at a given point in its movement; substantially as described.

10. Apparatus for the manufacture of glass, having a plurality of radially arranged separately movable supports, separate gearing for actuating each of the supports, a measuring cup or vessel mounted on each support, and means for imparting a shearing movement to each cup or vessel relatively to an adjacent vessel; substantially as described.

11. In apparatus for the manufacture of glass, a supporting arm arranged to rotate in a horizontal plane, a measuring cup or receptacle mounted on said arm, and means for imparting a radial movement to said receptacle at a certain point during its rotary movement to shear the glass; substantially as described.

12. In apparatus for the manufacture of glass, a plurality of supporting arms mounted for separate movement around a common center in a horizontal plane, means for rotating said arms, a measuring cup or receptacle mounted on said arms and means for tipping the cups or receptacles at a point in the movement of said arms; substantially as described.

13. In apparatus for the manufacture of glass, a supporting arm, gearing for rotating said arm in a horizontal plane at a predetermined speed, and a second gear for imparting a different speed of movement to said arms in different portions of its travel, and a measuring cup or vessel carried by said arm; substantially as described.

14. In apparatus for the manufacture of glass, a supporting arm, gearing for rotating said arm in a horizontal plane and for imparting a different speed of movement to said arm in different portions of its travel, a measuring cup or vessel carried by said arm, and means for discharging the contents of said cup or receptacle; substantially as described.

15. In apparatus for the manufacture of glass, a plurality of supporting arms mounted for separate movement around a common center in a horizontal plane, measuring cups or receptacles mounted on said arms, and cam means for effecting the discharge of the contents of the cups or receptacles at a point in the movement of the arms about their common center; substantially as described.

16. In apparatus for the manufacture of glass, a supporting arm, gearing for rotating said arm in a horizontal plane, a measuring cup or receptacle mounted on said arm, and cam means for effecting a radial movement of the cup or receptacle shearing the glass; substantially as described.

17. Apparatus for the manufacture of glass, comprising a plurality of supporting arms, means for rotating said arms in a horizontal plane, and a measuring cup or vessel mounted on each arm, said cups or vessels having lateral recesses or depressions at their upper portions at each side of their main cavity, together with means for shearing or cutting off the glass between adjacent cups or receptacles; substantially as described.

18. In apparatus for the manufacture of glass, a plurality of supporting arms mounted for separate movement around a common center in a horizontal plane, gearing for rotating said arms, measuring cups or receptacles loosely mounted on the arms and cam means arranged to engage the cups or receptacles to effect a tipping discharging movement thereof during the horizontal movement of the arms; substantially as described.

19. In apparatus for the manufacture of glass, a plurality of separate supporting arms mounted for separate movement around a common center, a measuring cup or receptacle mounted on each arm, and intermittently acting gearing for imparting separate movements to each arm; substantially as described.

20. In apparatus for the manufacture of glass, a plurality of separate supporting arms, a measuring cup or receptacle mounted on each arm, intermittently acting gearing for imparting separate movements to each arm, and supplemental gearing for imparting a slow movement to the arms during one of the intervals when the intermittent gearing for that arm is not acting; substantially as described.

21. In apparatus for the manufacture of glass, means for delivering a continuous stream of molten glass, a plurality of radially disposed supports mounted for separate movement around a common center, measuring cups or vessels mounted on supports and arranged to be moved thereby successively into position to receive the glass, together with means for moving said cups radially for shearing or cutting off the glass between the cups on adjacent supports after they have been filled; substantially as described.

22. In apparatus for the manufacture of glass, means for delivering a continuous stream of molten glass, a plurality of supports mounted for separate movement around a common center, measuring cups or vessels mounted on the supports and arranged to be moved thereby successively into position to receive the glass, means for imparting independent movements to the supports around their common axis, and means for imparting an independent radial movement to each of the cups or vessels to shear the glass between said adjacent cups or vessels; substantially as described.

In testimony whereof, I have hereunto set my hand.

CHARLES EDWIN BLUE.

Witnesses:
W. V. Hoge, Jr.,
M. L. Brown.